(12) United States Patent
Sunil Kumar et al.

(10) Patent No.: US 11,598,864 B2
(45) Date of Patent: Mar. 7, 2023

(54) METHOD AND SYSTEM FOR TESTING LIDAR SENSORS

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 985 days.

(21) Appl. No.: 16/282,340

(22) Filed: Feb. 22, 2019

(65) Prior Publication Data

US 2020/0209363 A1    Jul. 2, 2020

(30) Foreign Application Priority Data

Dec. 27, 2018 (IN) .............................. 201841049377

(51) Int. Cl.
| | |
|---|---|
| *G01S 17/06* | (2006.01) |
| *G01S 7/48* | (2006.01) |
| *G01S 7/02* | (2006.01) |
| *G01S 7/497* | (2006.01) |
| *G01S 17/931* | (2020.01) |
| *G01S 13/00* | (2006.01) |

(52) U.S. Cl.
CPC .............. *G01S 7/497* (2013.01); *G01S 17/06* (2013.01); *G01S 17/931* (2020.01)

(58) Field of Classification Search
USPC ...... 348/61, 118, 116; 356/3, 247, 248, 253, 356/255
See application file for complete search history.

(56) References Cited

U.S. PATENT DOCUMENTS

| | | |
|---|---|---|
| 2012/0087546 A1 | 4/2012 | Focke et al. |
| 2014/0214255 A1 | 7/2014 | Dolgov et al. |
| 2016/0139594 A1 | 5/2016 | Okumura et al. |
| 2019/0056483 A1* | 2/2019 | Bradley ............... G01S 7/4815 |

* cited by examiner

*Primary Examiner* — Daquan Zhao
(74) *Attorney, Agent, or Firm* — Finnegan, Henderson, Farabow, Garrett & Dunner, LLP (57) ABSTRACT

A system and method for testing a Light Detection and Ranging (LiDAR) sensor is disclosed. The system includes the LiDAR sensor radiating a plurality of LiDAR rays, a plurality of bars positioned at a predetermined distance from the LiDAR sensor, and a testing device. The method includes triggering a LiDAR sensor to radiate a plurality of LiDAR rays. The method further includes determining at least one intersection point at each of a plurality of bars upon intersection of at least one LiDAR ray from the plurality of LiDAR rays with each of the plurality of bars. The method further includes computing at least one operational parameter for the LiDAR sensor based on the intersection points, and determining one or more test results based on the one or more operational parameters.

16 Claims, 8 Drawing Sheets

METHOD AND SYSTEM FOR TESTING LIDAR SENSORS

TECHNICAL FIELD

This disclosure relates generally to LiDAR sensors, and more particularly to a method and system for testing LiDAR sensors.

BACKGROUND

Light Detection and Ranging (LiDAR) technology finds implementation across multiple technology domains for various purposes, such as, surveying. One such implementation is in the domain of Autonomous Ground Vehicles (AGVs) that aim to replace or reduce human intervention in driving the vehicle. The AGV may employ a LiDAR sensor for localizing the AGV on a map and guiding the AGV on a trajectory.

However, the AGV may face various uncertainties with regards to vision afforded by the LiDAR sensor. For example, the LiDAR sensor may be blocked by a snowflake during snowfall, that may lead to error in the obtained LiDAR data. Similarly, a drop of water during rainfall may cause lens effect, which may introduce an error in the obtained LiDAR data. Further, accuracy of the data may be marred by an object, such as a tree leaf wrapping and blocking LiDAR sensor for a period of time. These errors in the data obtained by the LiDAR sensor may lead to AGV making wrong navigation and driving decisions.

Some conventional techniques in this regard suffer various limitations. For example, some conventional techniques provide for detecting runtime difficulties in a sensor's vision system, and shifting vehicle control to human control. However, these techniques require data from multiple sensors. Further, these techniques attempt to overcome the runtime difficulties by re-establishing a driving model based on probabilistic means afforded by sensor's partial vision. Due to this, judging weather-related difficulties becomes a lengthy process. Moreover, these techniques fail to handle random and abrupt sensor failure within a short duration of time.

Some other conventional techniques provide for shifting vehicle control to manual control upon detecting unsuitable conditions for vehicle. However, these techniques rely on LiDAR data (obtained by LiDAR sensor) considering it to be always accurate, and are unable to detect anomalies in the LIDAR data.

SUMMARY

In one embodiment, a method of testing a Light Detection and Ranging (LiDAR) sensor is disclosed. In one embodiment, the method may include triggering the LiDAR sensor to radiate a plurality of LiDAR rays. The method may further include determining at least one intersection point at each of a plurality of bars upon intersection of at least one LiDAR ray from the plurality of LiDAR rays with each of the plurality of bars, wherein each of the plurality of bars may be positioned at a predetermined distance from the LiDAR sensor. The method may further include computing at least one operational parameter for the LiDAR sensor based on the intersection points. The method may further include determining one or more test results based on the one or more operational parameters.

In another embodiment, a system for testing a Light Detection and Ranging (LiDAR) sensor is disclosed. The system includes the LiDAR sensor radiating a plurality of LiDAR rays. The system further includes a plurality of bars positioned at a predetermined distance from the LiDAR sensor. The each of the plurality of bars is configured to obstruct at least one LIDAR ray from the plurality of LiDAR rays. The system further includes a testing device, which further comprises a processor, and a memory communicatively coupled to the processor. The memory stores processor-executable instructions. The processor instructions, on execution, cause the processor to trigger the LiDAR sensor to radiate a plurality of LiDAR rays. The processor instructions further cause the processor to determine at least one intersection point at each of the plurality of bars upon intersection of at least one LiDAR ray with each of the plurality of bars, compute at least one operational parameter for the LiDAR sensor based on the intersection points, and determine one or more test results based on the one or more operational parameters.

In yet another embodiment, a non-transitory computer-readable storage medium is disclosed. The non-transitory computer-readable storage medium has instructions stored thereon, a set of computer-executable instructions causing a computer comprising one or more processors to perform steps comprising triggering a LiDAR sensor to radiate a plurality of LiDAR rays, determining at least one intersection point at each of a plurality of bars upon intersection of at least one LIDAR ray from the plurality of LiDAR rays with each of the plurality of bars. Each of the plurality of bars is positioned at a predetermined distance from the LIDAR sensor, computing at least one operational parameter for the LiDAR sensor based on the intersection points, and determining one or more test results based on the one or more operational parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
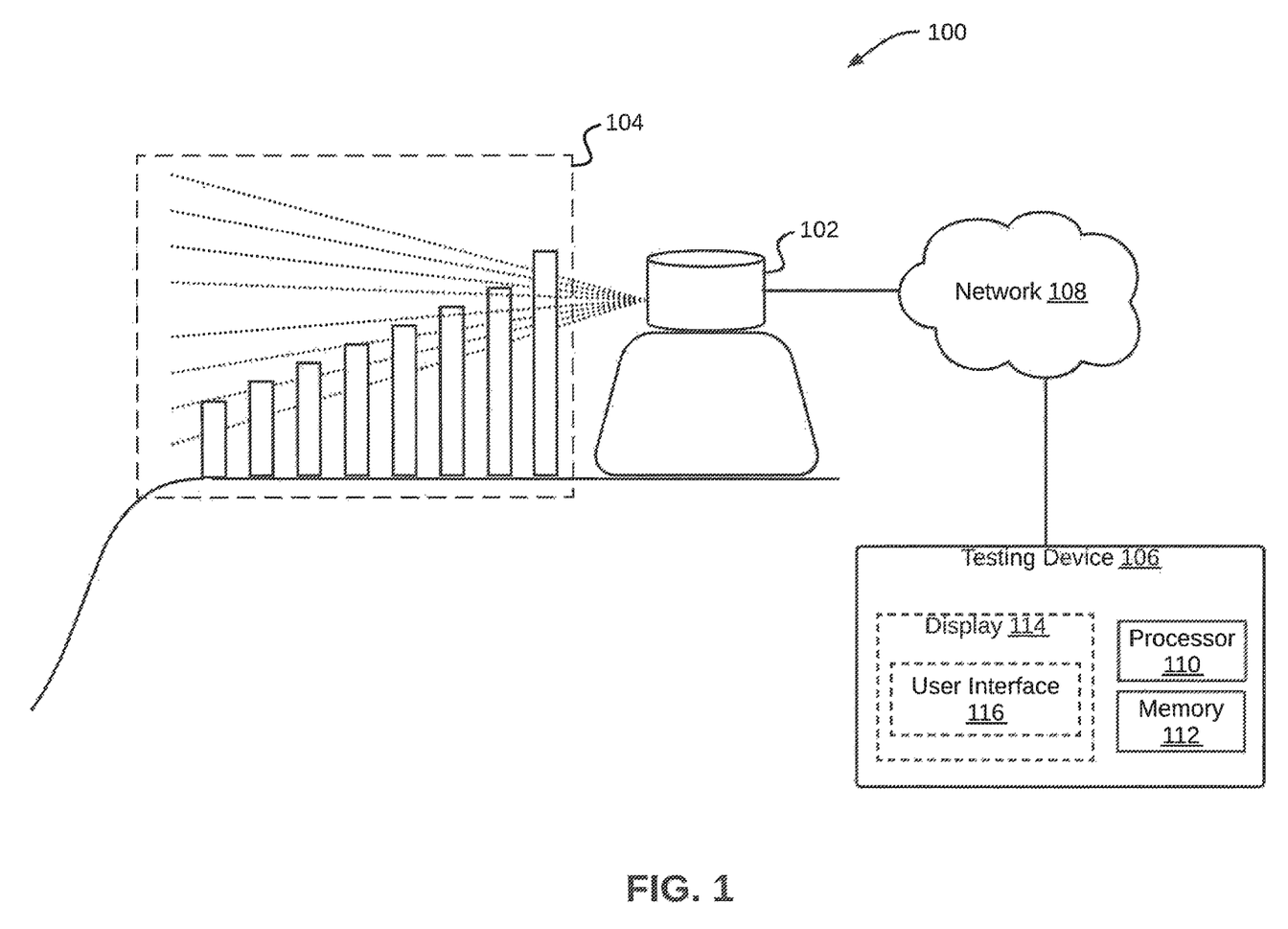
FIG. 1 illustrates a system for testing a Light Detection and Ranging (LiDAR) sensor, in accordance with an embodiment.

In one embodiment, a system 100 for testing a Light Detection and Ranging (LiDAR) sensor 102 is illustrated in the FIG. 1, in accordance with an embodiment. The system 100 may include the LiDAR sensor 102 that may radiate a plurality of LiDAR rays. The system 100 may further include a bar assembly 104 and a testing device 106. The bar assembly 104 may include a plurality of bars positioned at a predetermined distance from the LiDAR sensor 102. It may be noted that each of the plurality of bars may be configured to obstruct one or more LiDAR rays from the plurality of LiDAR rays radiated by the LiDAR sensor 102.

The testing device 106 may be communicatively coupled to the LiDAR sensor 102 in order to test the LiDAR sensor 102. The testing device 106 may be a computing device that has processing capability to test the LiDAR sensor 102. Examples of the computing device may include, but are not limited to, a server, a desktop, a laptop, a notebook, a netbook, a tablet, a smartphone, a mobile phone, an application server, a sever, or the like.

As will be described in greater detail in conjunction with FIG. 2 to FIG. 6, in order to test the LiDAR sensor 102, the testing device 106 may trigger the LiDAR sensor 102 to radiate the plurality of LiDAR rays. The testing device 106 may further determine one or more intersection points at each of the plurality of bars upon intersection of one or more LiDAR rays with each of the plurality of bars. The testing device 106 may further compute one or more operational parameter for the LiDAR sensor 102 based on the intersection points. Based on the one or more operational parameters, the testing device 106 may further determine one or more test results for the LiDAR sensor 102

In order to perform the above discussed functionalities, the testing device 106 may include a processor 110 and a memory 112. The memory 112 may store instructions that, when executed by the processor 110, cause the processor 110 to test the LiDAR sensor 102, for example, by way of determining one or more test results, as discussed in greater detail in FIG. 2 to FIG. 6. The memory 112 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., LiDAR sensor data, intersection point data, operational parameter data, test results data, predetermined distance data, coordinate data, comparison data, etc.) that may be captured, processed, and/or required by the system 100.

The testing device 106 may further include a display 114 and a user interface 116. The testing device 106 may interact with a user and vice versa through the display 114. By way of an example, the display 114 may be used to display test results for the LiDAR sensor 102 to the user. By way of another example, the user interface 116 may be used by the user to provide inputs to the testing device 106.

The testing device 106 may interact with the LiDAR sensor 102 over a network 108 for sending or receiving various data. The network 108 may be a wired or a wireless network and the examples may include, but are not limited to the Internet, Wireless Local Area Network (WLAN), Wi-Fi, Long Term Evolution (LTE), and Worldwide Interoperability for Microwave Access (WiMAX).

In some embodiments, the system 100 may be implemented in a vehicle for assisting in navigation of the vehicle. By way of an example, the LiDAR sensor 102 and the bar assembly 104 may be mounted on the rooftop of the vehicle. It will be apparent to a person skilled in the art that the vehicle may be an autonomous or semi-autonomous vehicle.

Figure 2:
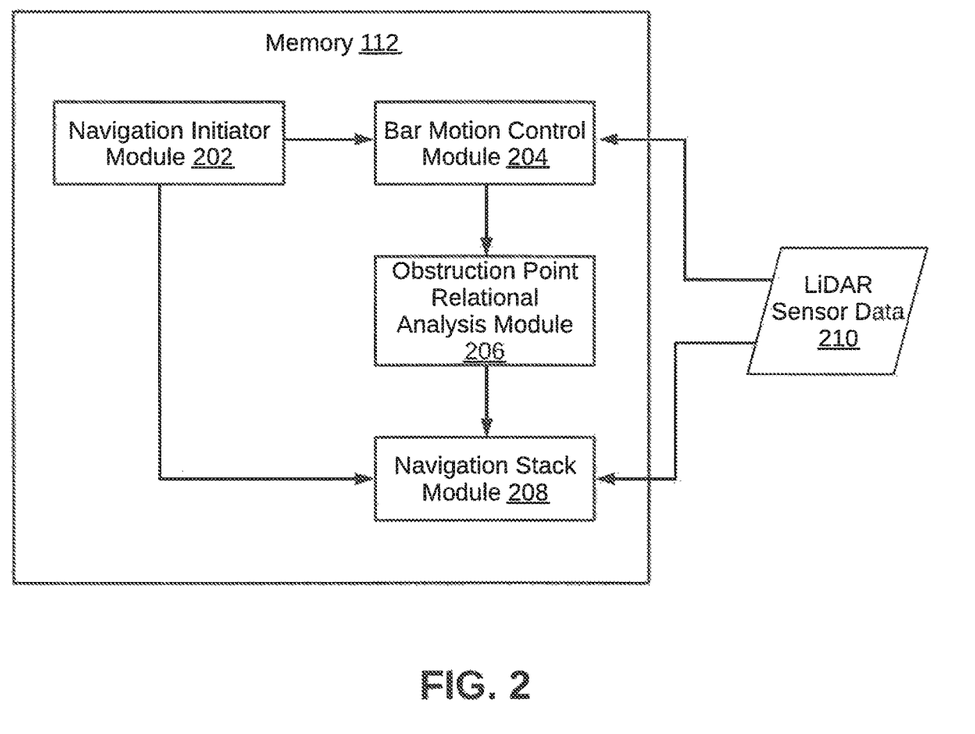
FIG. 2 illustrates a block diagram of a memory of a testing device configured to test a LiDAR sensor, in accordance with an embodiment.

Referring now to FIG. 2, a block diagram of the memory 112 within the testing device 106 configured to test the LiDAR sensor 102 is illustrated, in accordance with an embodiment. The memory 112 may include modules that may perform various functions so as to test the LiDAR sensor 102. The memory 112 may include a navigation initiator module 202, a bar motion control module 204, an obstruction point relational analysis module 206, and navigation stack module 208. As will be appreciated by those skilled in the art, all such aforementioned modules 202-208 may be represented as a single module or a combination of different modules. Moreover, as will be appreciated by those skilled in the art, each of the modules 202-208 may reside, in whole or in parts, on one device or multiple devices in communication with each other. In some embodiments, the memory 112 may receive LiDAR sensor data 210 which may be stored in a LiDAR sensor database (not shown in FIG. 2) within the memory 112.

In some embodiments, the navigation initiator module 202 may be coupled to the display 114 of the testing device 106. The navigation initiator module 202 may generate a geographic map that may be displayed to the user via the display 114. The map may provide directions and estimated times of arrival for the vehicle. By way of an example, the map may be based on GOOGLE MAPS or APPLE MAPS or any custom maps used by the autonomous vehicle. As will be appreciated by those skilled in the art, the map may allow the user to track current location of the vehicle in a geographical territory. In some embodiments, the navigation initiator module 202 may receive user input via the user interface 116 for choosing a destination location point. Once the user input is received, the navigation initiator module 202 may initiate navigation process for autonomously guiding the vehicle to the destination location. The navigation process may include path planning, velocity generation and control, and avoiding obstacles.

The bar motion control module 204 may be communicatively coupled to the bar assembly 104. The bar motion control module 204 may plan and cause movement of the plurality of bars. In some embodiments, the bar motion control module 204 may cause the plurality of bars to move sequentially between a first vertical position to a second vertical position. In other words, the bar motion control module 204 may trigger the multiple bars to move up and down. As it will be explained later, each of the plurality of bars may be caused to move between a first vertical position and a second vertical position (up and down) after a predetermined time interval to block one or more LiDAR rays for a time interval. This process may be performed continuously in sequence for each of the plurality of bars.

The obstruction point relational analysis module 206 may obtain the intersection points at a bar upon intersection of the one or more LiDAR rays, when the bar is at the second vertical position. As mentioned earlier, each bar moves between the first vertical position and the second vertical position. As a result, multiple intersection points may be obtained at each bar upon intersection of one or more LiDAR rays at different vertical levels of the bar. In some embodiments, the obstruction point relational analysis module 206 may record the highest intersection point obtained at each bar. In other words, the LiDAR ray intersecting the bar at the highest vertical level is captured. The obstruction point relational analysis module 206 may further plot the intersection points obtained at each of the plurality of bars on a two-dimensional (2-D) graph. In other words, interaction points of the LiDAR rays form each bar is plotted on a 2-D graph, whose center is the center of the LiDAR sensor 102. The obstruction point relational analysis module 206 may further perform a relation analysis of the intersection points to determine symmetry and uniformity of the LiDAR sensor 102.

The navigation stack module 208 may assist in navigation of a vehicle, in which the system 100 is implemented. The navigation stack module 208 may receive start and destination point on a map from a user. Based on the start and destination point, the navigation stack module 208 may plan a path for the vehicle and generate velocity commands to enable movement of the vehicle. The navigation stack module 208 may continuously localize the vehicle on the map based on environment observation by the LiDAR sensor 102. Further, based on the determined symmetry and uniformity of the LiDAR sensor 102, the navigation stack module 208 may decide whether to continue navigation or stop moving.

Figure 3:
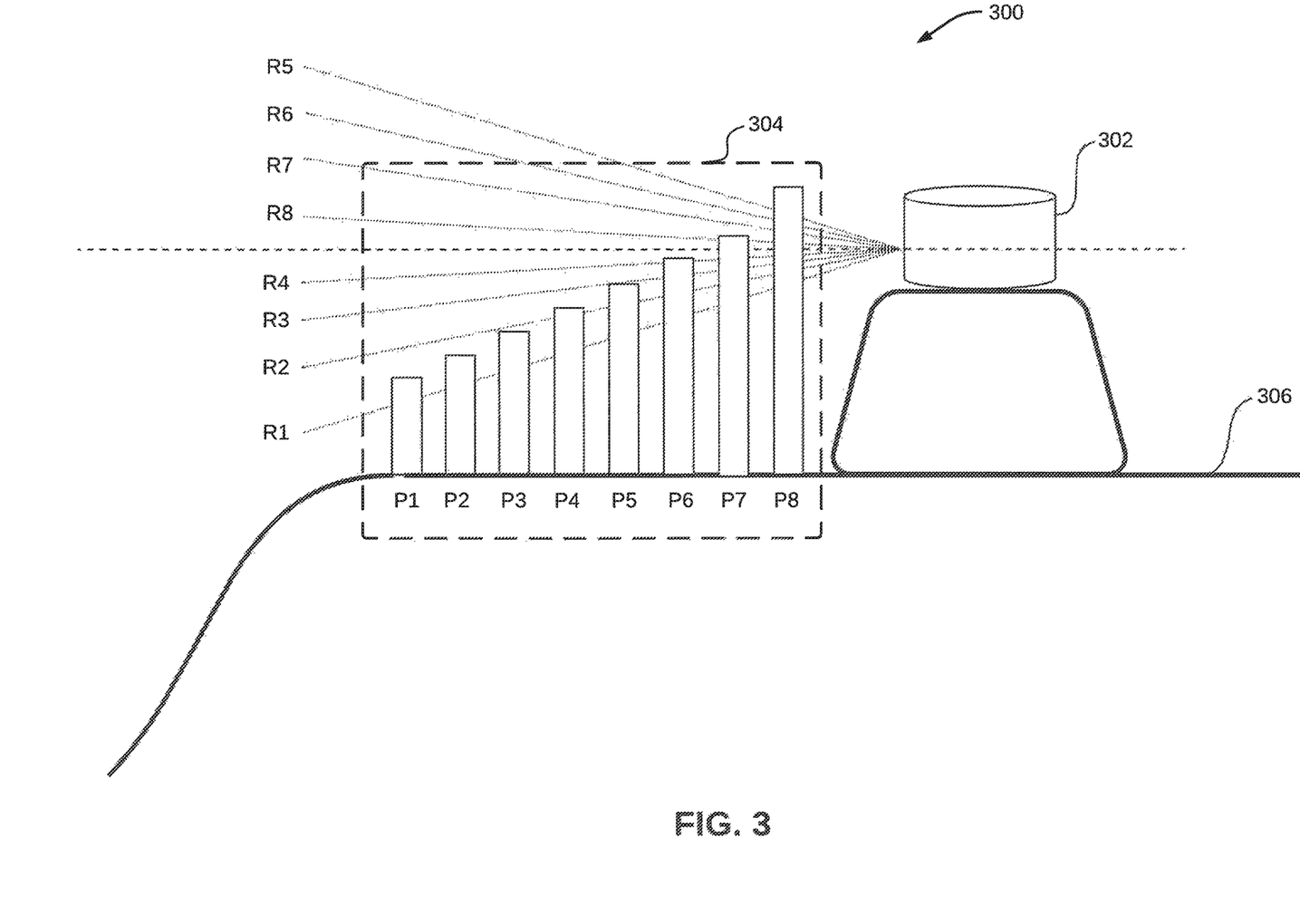
FIG. 3 illustrates a system for testing a LiDAR sensor, in accordance with another embodiment.

Referring now to FIG. 3, a system 300 (which is analogous to the system 100) for testing a LiDAR sensor 302 is illustrated, in accordance with another embodiment. It will be apparent to a person skilled in the art that the LiDAR sensor 302 is analogous to the LiDAR sensor 102. The system 300 includes the LiDAR sensor 302 and a bar assembly 304. The system 300 may be implemented in a vehicle 306 in order to assist navigation of the vehicle 306. The LiDAR sensor 302 and the bar assembly 304 are mounted on the rooftop of the vehicle 306. The LiDAR sensor 302 may be triggered to radiate LiDAR rays R1-R8 in the forward driving direction of the vehicle 306. Each of the LiDAR rays R1-R8 may be projected in a different vertical angular orientation. For example, the LiDAR ray R1 is projected in the lowest angular orientation, and the LiDAR ray R4 is projected in the largest angular orientation.

The bar assembly 304 includes a first set of eights bars, i.e., P1-P8 and a second set of eight bars, i.e., P1'-P8'. It will be apparent to a person skilled in the art that only the first set of eight bars are visible in the view afforded by the FIG. 3. Each bar in the first and the second set of eight bars is positioned at a predetermined distance from the LiDAR sensor 302. The bars P8 and P8' may be positioned closest to the LiDAR sensor 302, and the bars P1 and P1' may be positioned farthest from the LiDAR sensor 302. In some embodiments, each bar of first set (and a corresponding bar of the second set) may be configured to block one LiDAR ray.

Further, each bar in the first and the second set of eight bars is configured to obstruct one or more of the LiDAR rays R1-R8. As is apparent from the FIGS. 3, P1 and P1' may obstruct LiDAR rays R1, P4 and P4' may obstruct LiDAR rays R1 and R2, P6 and P6' may obstruct rays R1, R2 and R3, and so on. In other words, the bar positioned closest to the LiDAR sensor 302 may obstruct each of the LiDAR rays R1-R8, while the bar positioned farthest from the LiDAR sensor 302 may obstruct only one LiDAR ray, i.e., R1.

Further, the bars P1-P8 and P1-P8' are configured to move sequentially between a first vertical position and a second vertical position. The first vertical position for each bar in the first and the second set of eight bars is at equal vertical height, while the second vertical position of a bar in the first set of eight bars is at a different vertical height from a second vertical position of other bars in the first set of eight bars. This is applicable to each bar in the second set of eight bars as well. By way of an example, second vertical positions of the bars nearest to the LiDAR sensor 302, i.e., P8 and P8' are the highest, and second vertical positions of the bars farthest from the LiDAR sensor, i.e., P1 and P1' are the lowest. It may be noted that a second vertical positions of the bars in each set may decrease from the bar nearest to the LiDAR sensor 302 to the bar farthest from the LiDAR sensor 302. Thus, at the second vertical position, the bars P8 and P8' may be able to obstruct all the LiDAR rays R1-R8, and the bars P1 and P1' may be able to obstruct only one LiDAR ray R1.

Figure 4A:
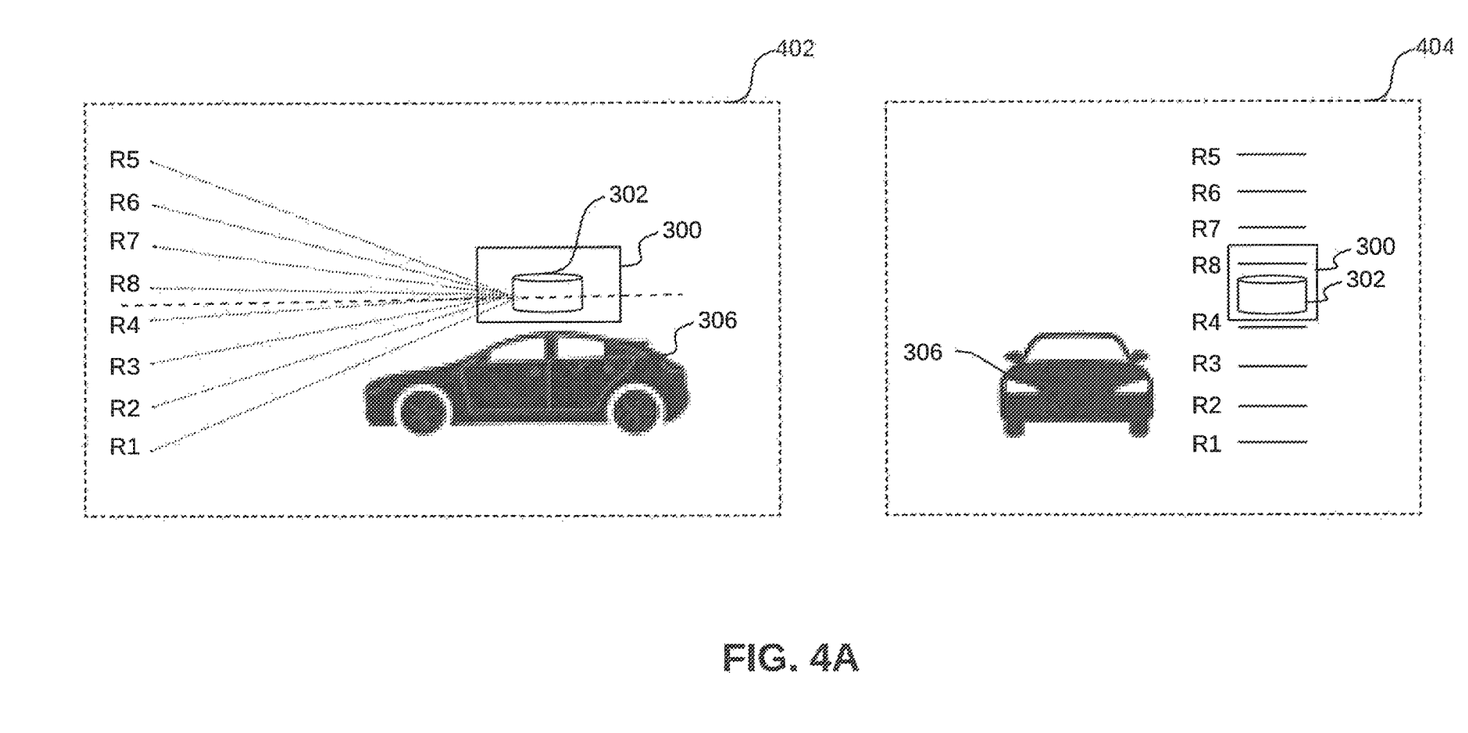
FIGS. 4A-4B illustrate various views of a system for testing a LiDAR sensor as implemented in a vehicle, in accordance with an embodiment.
Figure 4B:
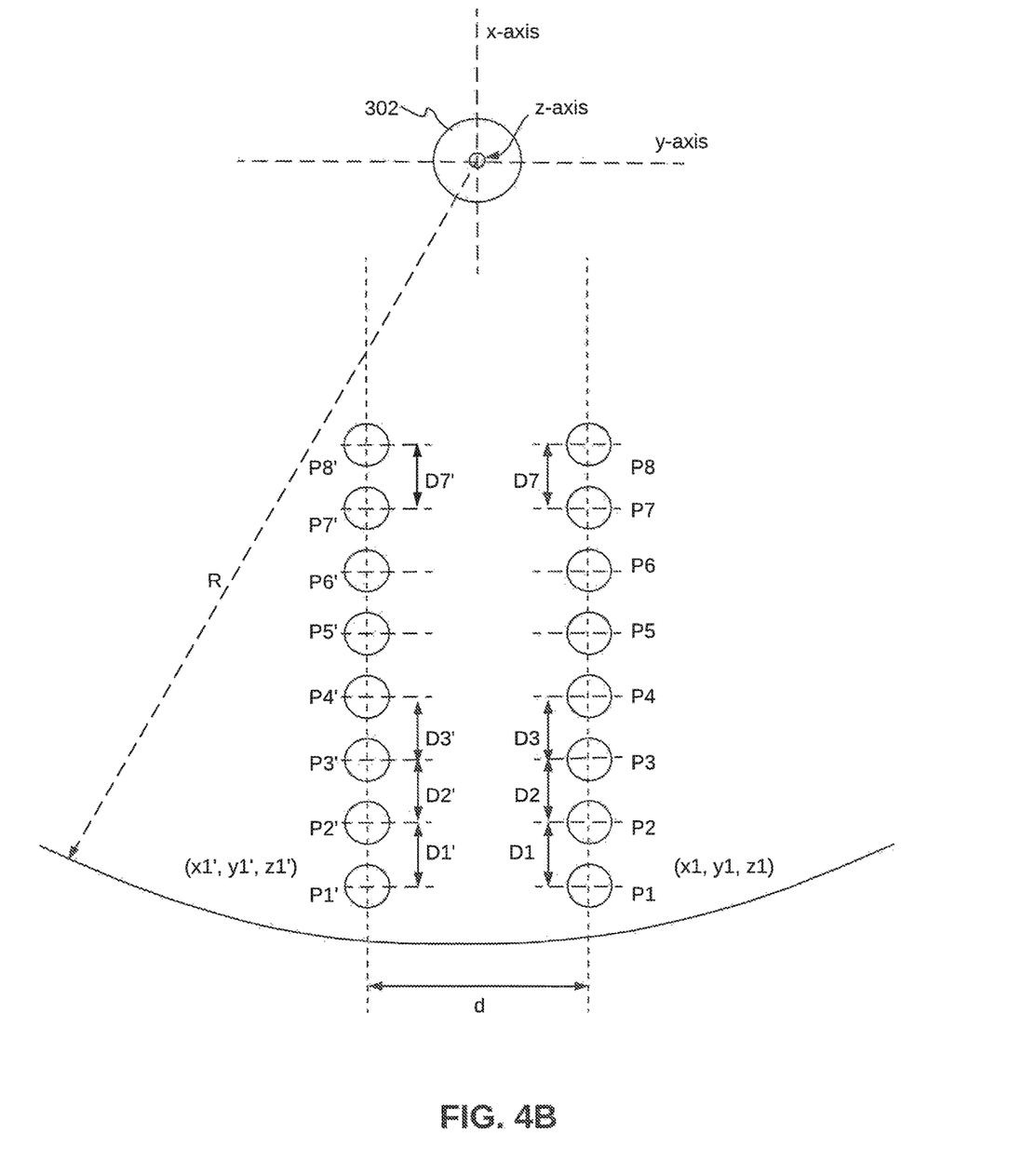

Referring now to FIGS. 4A-4B, various views of the system 300 as implemented in the vehicle 306 are illustrated, in accordance with an embodiment. FIG. 4A shows a side view 402 and a front view 404 of the system 300 and the vehicle 306, in which the system 300 is implemented. The system 300 includes the LiDAR sensor 302 and the bar assembly 304 (not shown). As mentioned earlier, the LiDAR sensor 302 may radiate the LiDAR rays R1-R8 in the forward driving direction of the vehicle 306, and that each of the LiDAR rays R1-R8 may be projected at different vertical angular orientation. It may be noted that the LiDAR sensor 302 may radiate LiDAR rays in a pre calibrated angular orientation with respect to 'z' axis corresponding to each of the LiDAR rays R1-R8 to form a ring of LiDAR rays in the each angular orientation, as shown in the front 404.

FIG. 4B illustrates a top view of the system 300 including the LiDAR sensor 302 and the bar assembly 304. The bars in the bar assembly 304 are positioned within a predetermined radius 'R' from the LiDAR sensor 302. By way of an example, the radius R may be 50 centimeters. As can be seen, the bars P1-P8 and the bars P1'-P8' are arranged in two parallel straight lines. Further, each pair of adjacent bars in the first and second set of eight bars are separated by a first predetermined distance. By way of an example, the adjacent bars P1 and P2 (belonging to the first set of eight bars, i.e., P1-P8) are separated by a first predetermined distance D1. Further, the bars P1' and P2' (belonging to the second set of eight bars, i.e., P1-P8') are separated by a first predetermined distance D1'. In a similar manner, remaining pair of bars in the first set of eight bars are separated by first predetermined distances D2, D3, D4, D5, D6, and D7 respectively. Similarly, remaining pair of bars in the second set are separated by first predetermined distances D2', D3', D4', D5', D6', and D7'. In an embodiment, D1=D2=D3=D4=D5=D6=D7, where, D1 is the distance between P1 and P2, D2 is the distance between P2 and P3, D3 is the distance between P3 and P4, D4 is the distance between P4 and P5, D5 is the distance between P5 and P6, D6 is the distance between P6 and P7, and D7 is the distance between P7 and P8). Similarly, D1'=D2'=D3'=D4'=D5'=D6'=D7', where, D1 is the distance between P1' and P2', D2' is the distance between P2' and P3', D3' is the distance between P3' and P4', D4' is the distance between P4' and P5', D5' is the distance between P5' and P6', D6' is the distance between P6' and P7', and D7' is the distance between P7' and P8'.

As mentioned above, the first set of eight bars, i.e., P1-P8, and the second set of eight bars, i.e., P1-P8', are arranged in two parallel straight lines. Each bar of the first set of eight bars is separated from a corresponding bar of the second set of eight bars by a second predetermined distance. By way of an example, the bars P1 and P1' belonging to the first set of eight bars and the second set of eight bars, respectively, are separated by a second predetermined distance 'd'. Similarly, the bars P2 and P2', bars P3 and P3' . . . P8 and P8' are separated by the second predetermined distance 'd.' Each bar of the first set of eight bars and the corresponding bar of the second set of eight bars are spaced from the LiDAR sensor 302 by a third predetermined distance. In other words, each bar of the first set of eight bars and the corresponding bar of the second set of eight bars are equally spaced from the LiDAR sensor 302. For example, distance between the bar P1 and the LiDAR sensor 302 is same as distance between the bar P1' and the LiDAR sensor 302. This may apply for the rest of the bars of the first set of eight bars and the second set of eight bars.

Figure 5:
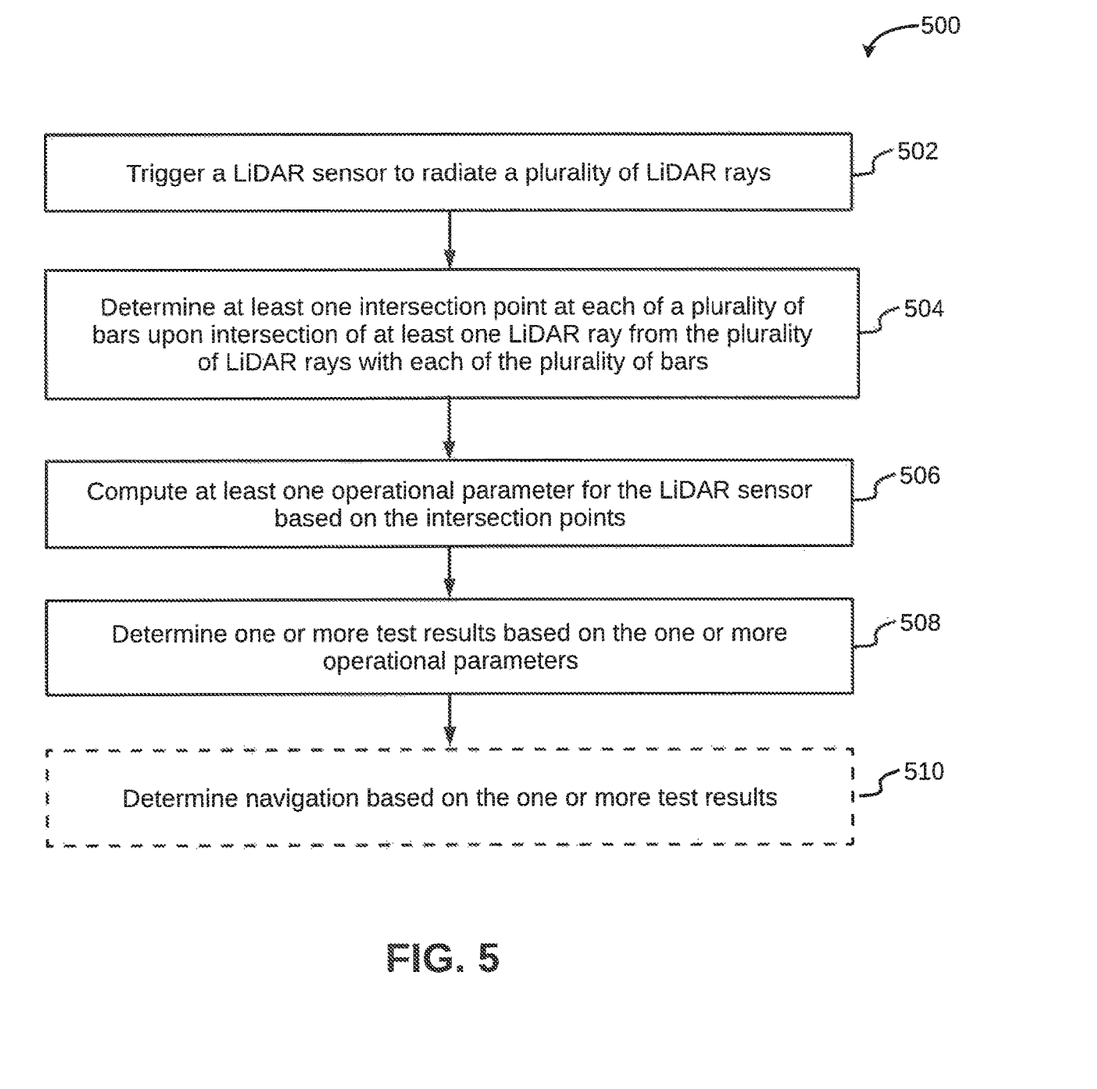
FIG. 5 illustrates a flowchart of a method of testing a LiDAR sensor, in accordance with an embodiment.

Referring now to FIG. 5, a flowchart 500 of a method for testing the LiDAR sensor 302 is illustrated, in accordance with an embodiment. At step 502, the LiDAR sensor 302 may be triggered to radiate a plurality of LiDAR rays. As will be appreciated by those skilled in the art, LiDAR technology may include a LiDAR sensor illuminating a target with pulsed laser light, and measuring the reflected light. At step 504, one or more intersection points may be determined at each of the plurality of bars, for example, the bars P1-P8 and the bars P1'-P8'. It may be understood that the one or more intersection points may be obtained upon intersection of one or more LiDAR rays from the plurality of LiDAR rays with each of the plurality of bars.

At step 506, one or more operational parameters for the LiDAR sensor 302 may be computed based on the one or more intersection points. The one or more operational parameters may include position coordinates of each of the plurality of bars, for example, the bars P1-P8 and the bars P1-P8'. By way of an example, the (x, y, z) coordinates of the intersection points at each of the bars P1-P8 and the bars P1-P8' may be determined, with respect to x-axis, y-axis and z-axis (as shown in FIG. 4B, z-axis being through the plane).

Each bar in the first and second set of eight bars may block one or more LiDAR rays. In an embodiment, each bar in the first and second set of eight bars may block a part of the one or more LiDAR rings. By way of an example, the bar P1 may block the LiDAR ray R1 at (x1, y1, z1) and P1' may block the LIDAR ray R1 at (x1', z1'), such that x1=x1' and z1=z1'. However, the bars P4 and P4' may block both the LiDAR rays R1 and R2. The bar P4 may block the LiDAR ray R1 at (x4, y4, z4) and the ray R2 at (x4, y4, z'4). Similarly, the bar P4' may block the LIDAR ray R1 at (x4', y4', z4') and the LiDAR ray R2 at (x4', y4', z'4'). In this case, x4=x4', z4=z4' and z'4=z'4'. To capture intersection points on the bar P4, the intersection points that correspond only to the LiDAR ray R2 may be considered at the bar P4. Thus, for each bar, only the highest intersection points may be considered for further analysis. Accordingly, in the current example, for bars P4 and P4', the coordinates (x4, y4, z'4) and (x4', y4', z'4') may be considered.

At step 508, one or more test results may be determined based on the one or more operational parameters. The one or more operational parameters may include position coordinates of each of the plurality of bars. In some embodiments, the one or more test results may be determined by obtaining a summation of 'y' coordinate of a bar in the first set of eight bars and coordinate of a corresponding bar in the second set of eight bars. Alternatively, or additionally, the one or more test results may be determined by obtaining a difference of 'x' coordinates of such bars. Based on the summation of 'y' coordinates or the difference of 'x' coordinates, alignment of the LiDAR sensor 302 may be determined. By way of an example, for an accurately aligned LiDAR sensor 302, the summation of 'y' coordinates of intersection points obtained on the bars P1 and P1', i.e., y1 and y1' respectively, should be equal to zero, i.e., y1+y1'=0. Similarly, the difference of 'x' coordinates of intersection points obtained on the bars P1 and P1', i.e., x1 and x1' respectively, should be equal to zero, i.e., x1−x1'=0. However, if the summation of 'y' coordinates or the difference of 'x' coordinates is not equal to zero, this may indicate an error in the alignment of the LiDAR sensor 302.

In some embodiments, at step 508, a distance between bars of at least one adjacent pair of bars in each of the first set and second set of eight bars may be calculated. The distance may be calculated based on position coordinates of the intersection points obtained on each of the bars. Once the distance is calculated, it may be compared with the first predetermined distance, which is the distance separating the adjacent bars in each of the first set eight bars and second set of eight bars. By way of an example, the distance between the bars P1 and P2 (belonging to the first set of eight bars) is determined. It may be understood that the distance between the bars P1 and P2 may be determined based on the coordinates of the intersection points of the LiDAR rays obtained on the bars P1 and P2. It may be further understood that the determined distance between the bars P1 and P2 should ideally be equal to the first predetermined distance, i.e., D1.

When the determined distance between the bars P1 and P2 is different from the first predetermined distance, it may indicate a blockage or a misalignment, or a disorientation of the LiDAR sensor 302, as a result of a permanent or temporary obstruction. Examples of the permanent or temporary obstruction may include, but are not limited to a water droplet, snowflakes, a leaf, or a scratch on the LiDAR sensor 302. The blockage may result in an offset in the determined distance between the bars P1 and P2 when compared with the first predetermined distance. By way of an example, a drop of water on the LIDAR sensor 302 may produce a lens effect causing deviation (due to wavelength change) of the LIDAR rays, thereby leading to an offset in the determined distance. Accordingly, when the distance between the bars P1 and P2 is determined to be equal to the first predetermined distance, this indicates that there is no blockage on the LiDAR sensor 302. However, when the distance between the bars P1 and P2 is determined to be lesser or greater than the first predetermined distance, this may indicate that the LiDAR sensor 302 has a blockage.

Similarly, the distance between other adjacent pairs of bars in the first set of eight bars, i.e., P2 and P3, P3 and P4, . . . P7 and P8 and other adjacent pairs of bars in the second set of eight bars, i.e., P1' and P2', P2' and P3', . . . P7' and P8' may be determined and compared to a corresponding first predetermined distance. If an offset from the first predetermined distance is observed in any of the above determined distances, it may indicate a blockage on the LiDAR sensor 302.

At step 510, navigation may be determined based on the one or more test results. In some embodiments, it may be determined whether the LiDAR sensor 302 may continue to assist navigation of an autonomous vehicle or not. By way of an example, if at step 508, no error in the alignment of the LiDAR sensor 302 is determined, the LiDAR sensor 302 may continue to assist navigation of the autonomous vehicle. Similarly, if the LiDAR sensor 302 has no blockage, the LiDAR sensor 302 may continue to assist navigation of the autonomous vehicle. However, if at step 508, an error in the alignment of the LiDAR sensor 302 or a blockage on the LiDAR sensor 302 is determined, the LiDAR sensor 302 may stop assisting navigation of the autonomous vehicle.

Figure 6:
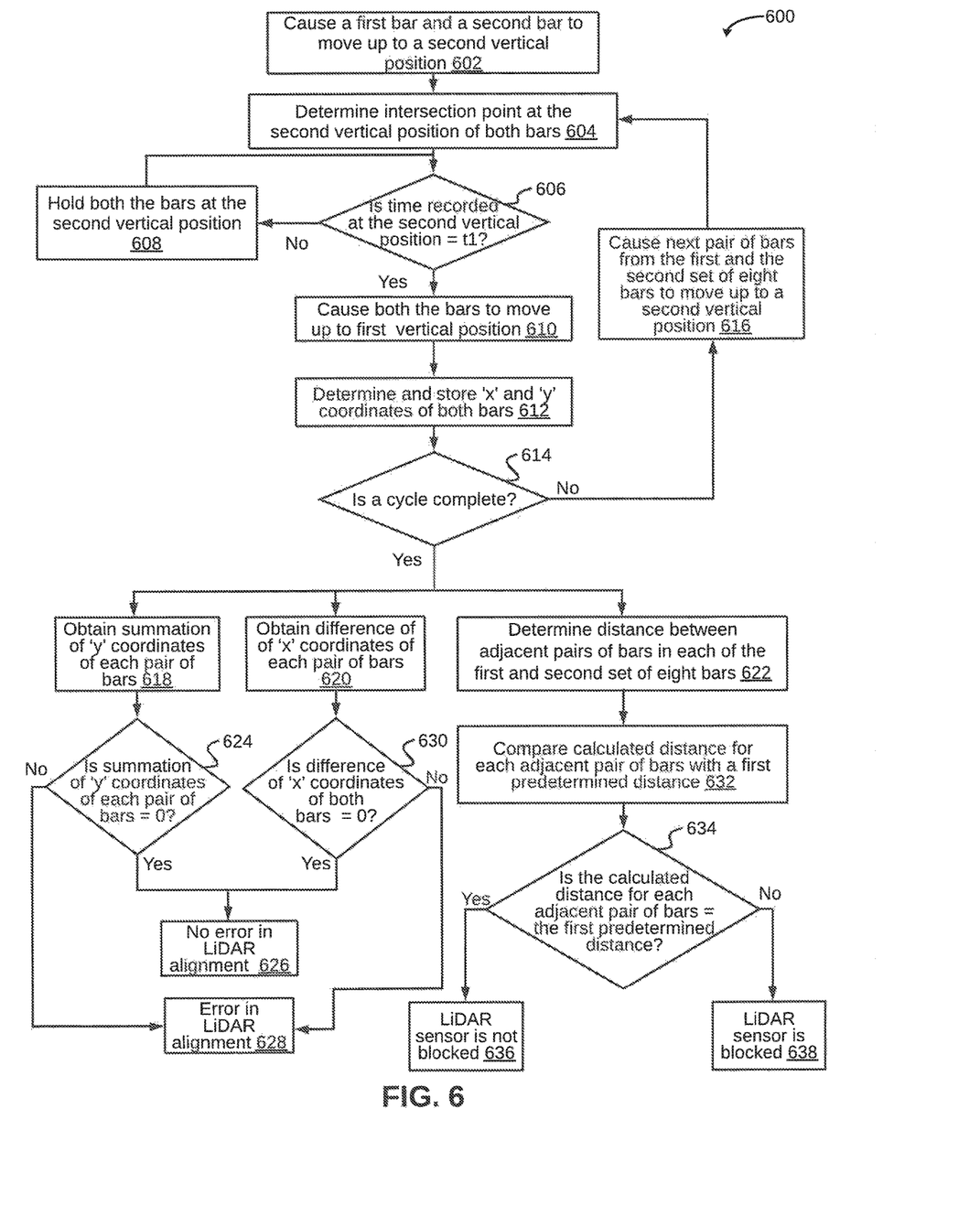
FIG. 6 illustrates a flowchart of a method of testing a LiDAR sensor, in accordance with another embodiment.

Referring to FIG. 6, a flowchart 600 of a method for testing a LiDAR sensor is illustrated, in accordance with another embodiment. At step 602, a first bar from a first set of eight bars, i.e., P1-P8, and a corresponding second bar from a second set of eight bars, i.e., P1'-P8' are caused to move from a first vertical position to a second vertical position. It may be noted that each bar in the first and second set of eight bars may move to the second vertical position, simultaneously. In the second vertical position, the first and the second bars may be configured to block at least one LiDAR ray from one or more LiDAR rays radiated by the LiDAR sensor 302. By way of an example, the first vertical position may correspond to a retracted position in which the first and second bars may not block any LiDAR rays. The second vertical position of the bars may correspond to an extended position in which the bars may block at least one LiDAR ray from the LiDAR sensor 302.

It may be noted that the first and second bars may be configured to travel to the second vertical position from the first vertical position after a first predetermined time interval. Thus, at step 602 the first and second bars may start to move from the first vertical position to the second vertical position. The first and second bars may be configured to stay at the second vertical position for a second predetermined time interval T. For example, the first and second bars may stay at the at the second vertical position for a time interval of 100 milliseconds before the first and second bars start to move back to the first vertical position. Once the first and second bars have moved to the first vertical position, next pair of bars from the first and second set of eight bars may start moving to a corresponding second vertical position from the first vertical position, and so on. By way of an example, when the bars P1 and P1' have moved back to their first vertical position, the bars P2 and P2' may start moving to their corresponding second vertical position. This is repeated for each pair of bars in the first and second set of eight bars. One cycle may be considered to be complete when each pair of bars in the first and second set of eight of bars have moved from the corresponding first vertical position to the corresponding second vertical position, and then back to the corresponding first vertical position. Once a cycle is complete, there may be a gap of a third predetermined time interval, before the next cycle starts. The third predetermined time interval, for example, may be of 2 seconds.

At step 604, intersection points of LiDAR rays at the first and second bars may be determined, when the first and second bars are at the second vertical position. It may be understood that since the bars gradually move between the first and second vertical position, the bars may have multiple intersection points of the LiDAR rays at different vertical levels of the bars. In the current embodiment, the intersection points at the highest vertical level of the first and second bars are determined and recorded. In other words, the (x, y, z) coordinates of the intersection points at the highest vertical level are determined.

At step 606, a check is performed to determine whether the time interval for which the first and second bars are stationary at the second vertical position is equal to the second predetermined time interval 't1'. In other words, it is determined whether it is time for the bars to start moving from the second vertical position to the first vertical position. If it is determined that the time interval is less than the second predetermined time interval 't1', at step 608, the first and second bars are held at the second vertical position. The control then moves back to the step 606. In other words, the first and second bars may be held at the second vertical position until the second predetermined time interval t1 has elapsed.

Referring back to step 606, if it is determined that the time interval is equal to or greater than the second predetermined time interval t1, the first and second bars are caused to move to the first vertical position at step 610. Once the first and second bars have moved to the first vertical position, at step 612, 'x' and 'y' coordinates of the intersection points at the first and second bars may be determined and stored. It may be understood that the 'x' and 'y' coordinates of the intersection points at the first and second bars may pertain to the position of the first and second bars. It may be noted that the positions of the bars are predetermined, as well as the distance of separation of bars of each adjacent pair of bars in the first and second set of eight bars is predetermined.

At step 614, a check is performed to determine if a cycle is complete or not. In other words, it is determined if each bar in the first and second set of eight bars has completed movement between the corresponding first vertical position to the corresponding second vertical position and then back to the corresponding first vertical position. If the cycle is not yet complete, then next pair of bars in the first and second set of eight bars are caused to move to their corresponding second vertical position at step 616. Thereafter, the control moves to the step 604. After completion of the cycle, and 'y' coordinates of intersection points at each pair of bars from the first and second set of eight bars are determined and stored.

Referring back to step 614, if it is determined that the cycle is complete, the control may then proceed to one or more of steps 618, 620, or 622. The control may proceed to these steps one at a time, or simultaneously to all these steps. When the method proceeds to step 618, a summation of 'y' coordinates of each pair of bars (for example, the first and second bars) is obtained. By way of an example, summations of 'y' coordinates are determined for: (P1 and P1'), (P2 and P2'), (P3 and P3'), (P4 and P4'), (P5 and P5'), (P6 and P6'), (P7 and P7'), and (P8 and P8'). Thereafter, at step 624, a check is performed to determine whether the summations of 'y' coordinates for each pair of bars is equal to zero or not. If all the summations are determined to be equal to zero, it is determined at step 626 that there is no error in alignment of the LiDAR sensor 302. However, if at the step 624, summations corresponding to one or more pair of bars is not equal to zero, it is determined at step 628 that there may be an error in alignment of the LiDAR sensor 302.

Referring back to step 614, once the cycle is complete, the control may alternatively or additionally proceed to the step 620, where a difference between 'x' coordinates for each pair of bars from the first and second set of eight bars is obtained. By way of an example, difference between 'x' coordinates is determined for: (P1 and P1'), (P2 and P2'), (P3 and P3'), (P4 and P4'), (P5 and P5'), (P6 and P6'), (P7 and P7'), and (P8 and P8'). Thereafter, at step 630, a check is performed to determine whether the difference between 'x' coordinates for each pair of bars is equal to zero or not. If all the differences are determined to be equal to zero, it is determined at step 626 that there is no error in alignment of the LiDAR sensor 302. However, if at the step 630, it is determined that for one or more pairs of bars the difference between 'x' coordinates is not equal to zero, it is determined at the step 628 that there may be errors in the alignment of the LiDAR sensor 302.

Referring back to step 614, once the cycle is complete, the control may, alternatively or additionally, proceed to the step 622, where distance between adjacent pairs of bars in each of the first and second set of eight bars is determined, based on the 'x' and 'y' coordinates determined for each pair of bars at step 612. By way of an example, from the first set of eight bars, distances between (P1 and P2), (P2 and P3) . . . (P7 and P8) may be calculated. Similarly, from the second set of eight bars distances between each of (P1' and P2'), (P2' and P3') . . . (P7' and P8') may be calculated. Thereafter, at step 632 the calculated distances are compared with a first predetermined distance. In an embodiment, the first predetermined distance may be different for each adjacent pair of bars. At step 634, a check is performed to determine whether the calculated distances for each adjacent pair of bars is equal to the first predetermined distance. If the calculated distances for each adjacent pair of bars is equal to the first predetermined distance, it is determined at step 636 that the LiDAR sensor 302 is not blocked by a foreign object. However, if at the step 634, it is determined that the calculated distance for one or more adjacent pairs of bars is not equal to the first predetermined distance, it is determined at step 638 that the LiDAR sensor 302 is blocked by one or more foreign objects. Alternatively, difference between the calculated distance for each adjacent pair of bar and the first predetermined distance may be compared with a threshold value in order to determine whether the LiDAR sensor 302 is blocked by some foreign object or not.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
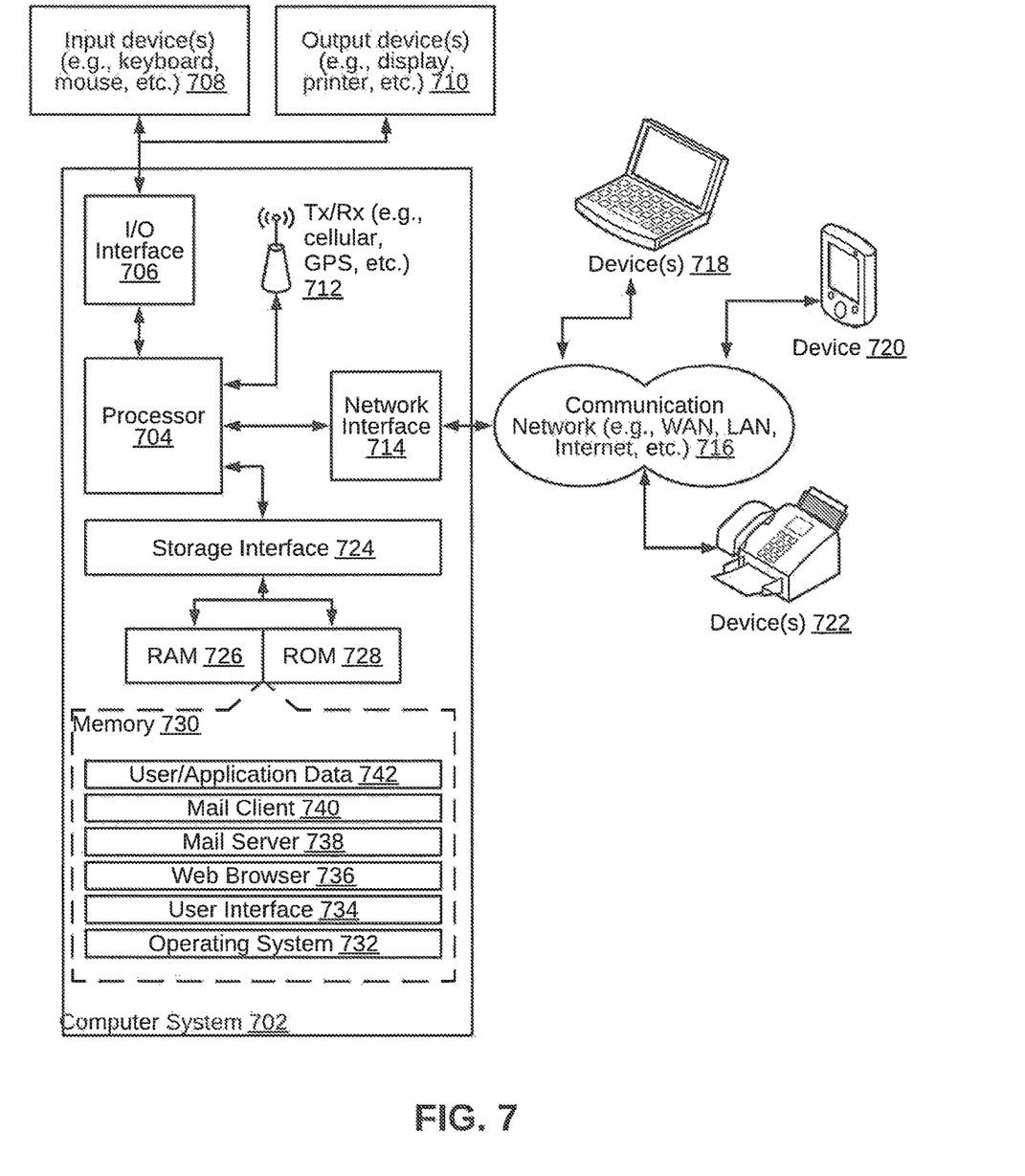
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. The computer system 702 may include a central processing unit ("CPU" or "processor") 704. The processor 704 may include at least one data processor for executing program components for executing user or system-generated requests. A user may include a person, a person using a device such as such as those included in this disclosure, or such a device itself. The processor 704 may include specialized processing units such as integrated system (bus) controllers, memory management control units, floating point units, graphics processing units, digital signal processing units, etc. The Processor 704 may include a microprocessor, such as AMD® ATHLON® microprocessor, DURON microprocessor OR OPTERON® microprocessor, ARM application, embedded or secure processors, IBM® POWERPC®, INTEL'S CORE® processor, ITANIUM® processor, XEON® processor, CELERON® processor or other line of processors, etc. The processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 704 may be disposed in communication with one or more input/output (I/O) devices via an I/O interface 706. The I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 706, the computer system 702 may communicate with one or more I/O devices. For example, an input device 708 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with the processor 704. The transceiver 712 may facilitate various types of wireless transmission or reception. For example, the transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618PMB9800® transceiver, or the like), providing IEEE 802.6a/b/g/n, Bluetooth, FM, global positioning system (GPS), 2G/3G HSDPA/HSUPA communications, etc.

In some embodiments, the processor 704 may be disposed in communication with a communication network 714 via a network interface 716. The network interface 716 may communicate with the communication network 714. The network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. The communication network 714 may include, without limitation, a direct interconnection, local area network (LAN), wide area network (WAN), wireless network (for example, using Wireless Application Protocol), the Internet, etc. Using the network interface 716 and the communication network 714, the computer system 702 may communicate with devices 718, 720, and 722. The devices 718, 720, and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 702 may itself embody one or more of these devices.

In some embodiments, the processor 704 may be disposed in communication with one or more memory devices (for example, a RAM 726, a ROM 728, etc.) via a storage interface 724. The storage interface 724 may connect to a memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 730 may store a collection of program or database components, including, without limitation, an operating system 732, a user interface application 734, a web browser 736, a mail server 738, a mail client 740, a user/application data 742 (for example, any data variables or data records discussed in this disclosure), etc. The operating system 732 may facilitate resource management and operation of the computer system 702. Examples of the operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 734 may facilitate display, execution, interaction, manipulation, or operation of program components through textual or graphical facilities. For example, user interfaces may provide computer interaction interface elements on a display system operatively connected to the computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 702 may implement a web browser 736 stored program component. The eeb browser 736 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, the computer system 702 may implement the mail server 738 stored program component. The mail server 738 may be an Internet mail server such as MICROSOFT® EXCHANGE® mail server, or the like. The mail server 738 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. The mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 702 may implement the mail client 740 stored program component. The mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 702 may store the user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to testing a LiDAR sensor. The techniques provide a software controlled mechanical system for dynamically monitoring performance of the LiDAR sensor during operation. The techniques are able to identify any misalignment or blockage of the LiDAR sensor by foreign bodies, which may lead to erroneous sensor data and hence incorrect navigation information. Thus, effect of factors of weather and surroundings on the accuracy of the LiDAR sensor are minimized. The technique, therefore, aid in making the navigation afforded by the LiDAR sensors more safe and reliable.

Various embodiments provide method and device for testing a LiDAR sensor. The method provides a software controlled mechanical system to monitor performance of LiDAR sensors, which are the primary sensor for autonomous navigation. This kind of monitoring provides additional safety for autonomous driving. Moreover, the detection of error in performance of the LiDAR sensor may be achieved within seconds.

The specification has described method and device for testing a LiDAR sensor. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed, Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of testing a Light Detection and Ranging (LiDAR) sensor, the method comprising:
    triggering, by a testing device, a LiDAR sensor to radiate a plurality of LiDAR rays;
    determining, by the testing device, at least one intersection point at each of a plurality of bars upon intersection of at least one LiDAR ray from the plurality of LiDAR rays with each of the plurality of bars, wherein each of the plurality of bars is positioned at a predetermined distance from the LiDAR sensor;
    computing, by the testing device, one or more operational parameters for the LiDAR sensor based on the intersection points,
        wherein the one or more operational parameters comprise position coordinates of each of the plurality of bars; and
    determining, by the testing device, one or more test results based on the one or more operational parameters.

2. The method of claim 1, wherein the LiDAR sensor and the plurality of bars are mounted on a vehicle's rooftop, and wherein the LiDAR sensor is configured to assist in navigation of the vehicle.

3. The method of claim 2, wherein the plurality of bars are divided into a first set of bars and a second set of bars, and wherein each bar of the first set and the second set of bars is configured to move sequentially between a first vertical position to a second vertical position.

4. The method of claim 3, wherein the first set of bars and the second set of bars are arranged in two separate parallel straight lines, and wherein bars of each pair of adjacent bars of the first set or the second set of bars are separated by a first predetermined distance.

5. The method of claim 3, wherein the first set of bars and the second set of bars comprise equal number of bars, wherein each bar of the first set of bars is separated from a corresponding bar of the second set of bars by a second predetermined distance, and wherein each bar of the first set and the corresponding bar of the second set are spaced from the LiDAR sensor by a third predetermined distance.

6. The method of claim 3, wherein the each bar of the first set and the second set of bars is configured to travel to the second vertical position from the first vertical position after a first predetermined time interval, and wherein each bar of the first set and the second set of bars is configured to stay at the second vertical position or the first vertical position for a second predetermined time interval.

7. The method of claim 6, wherein the second vertical position of each bar of the first set or the second set of bars is different from the second vertical position of each other bar of the first set or the second set of bars, respectively, and wherein amongst the first set and the second set of bars,
    second vertical position of the bar nearest to the LiDAR sensor is highest, and
    second vertical position of the bars decreases from the bar nearest from LiDAR sensor to the bar farthest from the LiDAR sensor.

8. The method of claim 1, wherein determining the one or more test results comprises:
    obtaining, by the testing device, a summation of 'y' coordinate of one bar of the first set of bars and Cy' coordinate of a corresponding bar of the second set of bars; or
    obtaining, by the testing device, a difference of 'x' coordinate of one bar of the first set of bars and 'x' coordinate of a corresponding bar of the second set of bars.

9. The method of claim 1, wherein determining the one or more test results further comprises:
    calculating, by the testing device, a distance between at least one pair of adjacent bars of each of the first set of bars and the second set of bars; and
    comparing, by the testing device, the calculated distance with the first predetermined distance by which the each pair of adjacent bars of each of the first set of bars and the second set of bars is separated.

10. A system for testing a Light Detection and Ranging (LiDAR) sensor, the system comprising:
    a plurality of bars positioned at a predetermined distance from the LiDAR sensor radiating a plurality of LiDAR rays, wherein each of the plurality of bars is configured to obstruct at least one LiDAR ray from the plurality of LiDAR rays; and
    a testing device, wherein the testing device further comprises:
        a processor;
        a memory communicatively coupled to the processor, wherein the memory stores processor-executable instructions, which, on execution, cause the processor to:
            trigger the LiDAR sensor to radiate a plurality of LiDAR rays;

determine at least one intersection point at each of the plurality of bars upon intersection of at least one LiDAR ray with each of the plurality of bars;

compute one or more operational parameters for the LiDAR sensor based on the intersection points,
wherein the one or more operational parameters comprise position coordinates of each of the plurality of bars; and determine one or more test results based on the one or more operational parameters.

11. The system of claim 10, wherein the plurality of bars are divided into a first set of bars and a second set of bars, and wherein each bar of the first set and the second set of bars is configured to move sequentially between a first vertical position to a second vertical position.

12. The system of claim 11, wherein the first set of bars and the second set of bars are arranged in two separate parallel straight lines, wherein bars of each pair of adjacent bars of the first set or the second set of bars are separated by a first predetermined distance, wherein the first set of bars and the second set of bars comprise equal number of bars, wherein each bar of the first set of bars is separated from a corresponding bar of the second set of bars by a second predetermined distance, and wherein each bar of the first set and the corresponding bar of the second set are spaced from the LiDAR sensor by a third predetermined distance.

13. The system of claim 12, wherein the each bar of the first set and the second set of bars is configured to travel to the second vertical position from the first vertical position after a first predetermined time interval, and wherein each bar of the first set and the second set of bars is configured to stay at the second vertical position or the first vertical position for a second predetermined time interval.

14. The system of claim 13, wherein the second vertical position of each bar of the first set or the second set of bars is different from the second vertical position of each other bar of the first set or the second set of bars, respectively, and wherein amongst the first set and the second set of bars,
second vertical position of the bar nearest to the LiDAR sensor is highest, and
second vertical position of the bars decreases from the bar nearest from LiDAR sensor to the bar farthest from the LiDAR sensor.

15. The system of claim 10, wherein determining the one or more test results comprises:
obtaining, by the testing device, a summation of Cy' coordinate of one bar of the first set of bars and 'y' coordinate of a corresponding bar of the second set of bars; or obtaining, by the testing device, a difference of 'x' coordinate of one bar of the first set of bars and 'x' coordinate of a corresponding bar of the second set of bars and wherein determining the one or more test results further comprises:
calculating, by the testing device, a distance between at least one pair of adjacent bars of each of the first set of bars and the second set of bars; and
comparing, by the testing device, the calculated distance with the first predetermined distance by which the each pair of adjacent bars of each of the first set of bars and the second set of bars is separated.

16. A non-transitory computer-readable storage medium having stored thereon, a set of computer-executable instructions causing a computer comprising one or more processors to perform steps comprising:
triggering a LiDAR sensor to radiate a plurality of LiDAR rays;

determining at least one intersection point at each of a plurality of bars upon intersection of at least one LiDAR ray from the plurality of LiDAR rays with each of the plurality of bars, wherein each of the plurality of bars is positioned at a predetermined distance from the LiDAR sensor;

computing one or more operational parameters for the LiDAR sensor based on the intersection points,
wherein the one or more operational parameters comprise position coordinates of each of the plurality of bars; and determining one or more test results based on the one or more operational parameters.

* * * * *